US012666271B2

(12) United States Patent
Medles et al.

(10) Patent No.: US 12,666,271 B2
(45) Date of Patent: Jun. 23, 2026

(54) SPECTRUM SHARING BETWEEN TERRESTRIAL NETWORK AND NON-TERRESTRIAL NETWORK WITH INTERFERENCE CONTROL

(71) Applicant: MediaTek Singapore Pte. Ltd., Singapore (SG)

(72) Inventors: Abdelkader Medles, Cambridge (GB); I-Kang Fu, Hsinchu City (TW); Shiang-Jiun Lin, Hsinchu City (TW); Gilles Charbit, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 325 days.

(21) Appl. No.: 18/253,973

(22) PCT Filed: Nov. 19, 2021

(86) PCT No.: PCT/CN2021/131640
§ 371 (c)(1),
(2) Date: May 23, 2023

(87) PCT Pub. No.: WO2022/111382
PCT Pub. Date: Jun. 2, 2022

(65) Prior Publication Data
US 2024/0098507 A1      Mar. 21, 2024

Related U.S. Application Data

(60) Provisional application No. 63/118,033, filed on Nov. 25, 2020.

(51) Int. Cl.
H04W 16/14          (2009.01)
H04W 16/28          (2009.01)
H04W 84/06          (2009.01)

(52) U.S. Cl.
CPC ........... *H04W 16/14* (2013.01); *H04W 16/28* (2013.01); *H04W 84/06* (2013.01)

(58) Field of Classification Search
CPC . H04W 52/146; H04W 84/06; H04W 52/367; H04W 52/242; H04W 52/243;
(Continued)

(56) References Cited

U.S. PATENT DOCUMENTS

2005/0245192 A1* 11/2005 Karabinis ............. H04W 88/06
455/12.1
2006/0205367 A1   9/2006 Karabinis
(Continued)

FOREIGN PATENT DOCUMENTS

CN          101411220 A      4/2009
CN          106470486 A      3/2017
(Continued)

OTHER PUBLICATIONS

International Search Report dated Feb. 8, 2022, issued in application No. PCT/CN2021/131640.
(Continued)

*Primary Examiner* — Marcus Hammonds
(74) *Attorney, Agent, or Firm* — McClure, Qualey & Rodack, LLP

(57) ABSTRACT

Solutions pertaining to spectrum sharing between a terrestrial network (TN) and a non-terrestrial network (NTN) with interference control are proposed. An apparatus implemented in a UE communicates with a non-terrestrial (NT) network node of the NTN by resource sharing with the TN. There is a requirement on either or both of a directive gain and a directive emission power with respect to a network node of the TN such that interference between TN downlink (DL) transmissions and NTN uplink (UL) transmissions is less than a threshold.

18 Claims, 5 Drawing Sheets

(58) Field of Classification Search
CPC ... H04W 52/245; H04W 16/14; H04W 16/28;
H04B 7/18513; H04B 7/18519; Y02D
30/70
See application file for complete search history.

(56) References Cited

U.S. PATENT DOCUMENTS

| | | | |
|---|---|---|---|
| 2011/0236199 A1 | 9/2011 | Bergman et al. | |
| 2011/0263199 A1 | 10/2011 | Cruz et al. | |
| 2016/0241328 A1 | 8/2016 | Kang et al. | |
| 2018/0048380 A1 | 2/2018 | Khan et al. | |
| 2019/0245590 A1* | 8/2019 | Singh ................... | H01Q 3/2611 |

FOREIGN PATENT DOCUMENTS

| | | | |
|---|---|---|---|
| CN | 109743738 A | 5/2019 | |
| CN | 111031476 A | 4/2020 | |
| CN | 111727658 A | 9/2020 | |
| CN | 111934919 A | 11/2020 | |

OTHER PUBLICATIONS

EP Search Report dated Jun. 18, 2024 in European application No.
21896883.2-1206/4244997.

* cited by examiner

200

Antenna
Downtilt Angle

Vertical
Beamwidth

-3dB

-3dB

*H*

*Inner Cell Radius*

*Outer Cell Radius* x          y (a) Sector Antenna 3D Pattern x (b) Sector Antenna 3D Pattern
Side View y (c) Sector Antenna 3D Pattern
Front View x (d) Sector Antenna 3D Pattern
Top View (e) Sector Antenna
Azimuth Plane Pattern (f) Sector Antenna
Elevation Plane Pattern

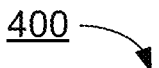

400

COMMUNICATE, BY A PROCESSOR OF A USER EQUIPMENT (UE), WITH A NON-TERRESTRIAL (NT) NETWORK NODE OF A NON-TERRESTRIAL NETWORK (NTN) BY RESOURCE SHARING WITH A TERRESTRIAL NETWORK (TN) SUCH THAT THERE IS A REQUIREMENT ON EITHER OR BOTH OF A DIRECTIVE GAIN AND A DIRECTIVE EMISSION POWER WITH RESPECT TO A NETWORK NODE OF THE TN SUCH THAT INTERFERENCE BETWEEN TN DOWNLINK (DL) TRANSMISSIONS AND NTN UPLINK (UL) TRANSMISSIONS IS LESS THAN A THRESHOLD

500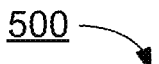

COMMUNICATE, BY A PROCESSOR OF A NETWORK NODE OF A TERRESTRIAL NETWORK (TN), WITH AT LEAST ONE USER EQUIPMENT (UE) BY RESOURCE SHARING WITH A NON-TERRESTRIAL NETWORK (NTN) SUCH THAT THERE IS A REQUIREMENT ON EITHER OR BOTH OF A DIRECTIVE GAIN AND A DIRECTIVE EMISSION POWER WITH RESPECT TO THE NETWORK NODE OF THE TN SUCH THAT INTERFERENCE BETWEEN TN DOWNLINK (DL) TRANSMISSIONS AND NTN UPLINK (UL) TRANSMISSIONS IS LESS THAN A THRESHOLD

SPECTRUM SHARING BETWEEN TERRESTRIAL NETWORK AND NON-TERRESTRIAL NETWORK WITH INTERFERENCE CONTROL

CROSS REFERENCE TO RELATED PATENT APPLICATION

The present disclosure is part of a non-provisional application claiming the priority benefit of U.S. Provisional Patent Application No. 63/118,033, filed on 25 Nov. 2020, the content of which being incorporated by reference in its entirety.

TECHNICAL FIELD

The present disclosure is generally related to mobile communications and, more particularly, to spectrum sharing between a terrestrial network (TN) and a non-terrestrial network (NTN) with interference control.

BACKGROUND

Unless otherwise indicated herein, approaches described in this section are not prior art to the claims listed below and are not admitted as prior art by inclusion in this section.

In wireless communications such as mobile communications according to the 3rd Generation Partnership Project (3GPP) specifications, spectrum sharing refers to two systems sharing the same carriers. For instance, in the context of TN-NTN spectrum sharing, the TN can reuse the same spectrum used by the NTN. This can free up a lot of spectrum for TN reuse. One challenge, however, is TN-to-NTN interference. Additionally, it is noteworthy that NTN satellite power on the ground tends to be relatively small. That is, NTN (e.g., satellite) power reaching a TN user equipment (UE) is typically significantly low (e.g., close to thermal noise floor) for most UEs that are within TN coverage. NTN UEs are expected to be outside of TN coverage, and thus the level of interference on TN network from NTN UEs tends to be low. On the other hand, one main challenge is TN interference on uplink (UL) transmissions from a NTN UE to a satellite. As a satellite beam can cover large areas, aggregate TN interference on NTN UL transmissions can be very high. Moreover, due to geographical separation, TN interference on downlink (DL) transmissions to NTN UEs tends to be less problematic. Therefore, there is a need for a solution for spectrum sharing between a TN and an NTN with interference control to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to spectrum sharing between a TN and an NTN with interference control.

In one aspect, a method may involve a UE communicates with a non-terrestrial (NT) network node of an NTN by resource sharing with a TN. There may be a requirement on either or both of a directive gain and a directive emission power with respect to a network node of the TN such that interference between TN DL transmissions and NTN UL transmissions is less than a threshold.

In another aspect, a method may involve a network node of a TN communicating with at least one UE by resource sharing with an NTN. There may be a requirement on either or both of a directive gain and a directive emission power with respect to the network node of the TN such that interference between TN DL transmissions and NTN UL transmissions is less than a threshold.

It is noteworthy that, although description provided herein may be in the context of certain radio access technologies, networks and network topologies such as TN and NTN, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 4 is a flowchart of an example process in accordance with an implementation of the present disclosure.

FIG. 5 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to spectrum sharing between a TN and an NTN with interference control. According to the present disclosure, a number of possible solutions may be implemented separately or jointly. That is, although these possible solutions may be described below separately, two or more of these possible solutions may be implemented in one combination or another.

Figure 1:
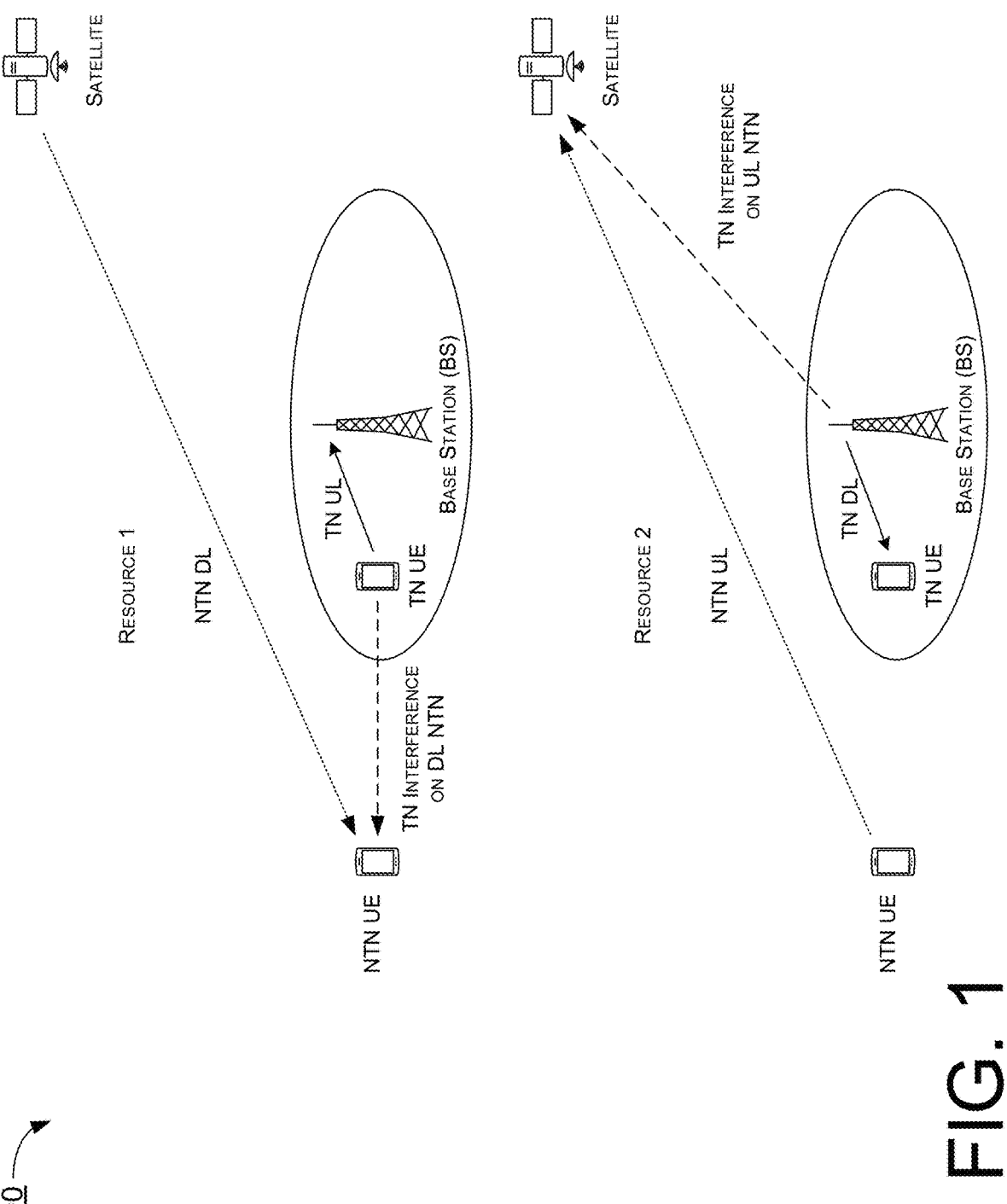
FIG. 1 is a diagram of an example scenario under a proposed scheme in accordance with the present disclosure.

FIG. 1 illustrates an example scenario 100 under a proposed scheme with respect to interference control for reverse pairing in accordance with the present disclosure. Under the proposed scheme, in reverse pairing of DL and UL transmissions between a TN and an NTN, NTN DL transmissions and TN UL transmissions may share the same resources. Conversely, NTN UL transmissions and TN DL transmissions may share the same resources. The resources may include time resource(s) (e.g., frame(s), slot(s), symbol(s), and so on) and/or frequency resource(s) (e.g., bandwidth part(s) (BWP(s)), resource block(s), frequency band(s), and so on).

Figure 2:
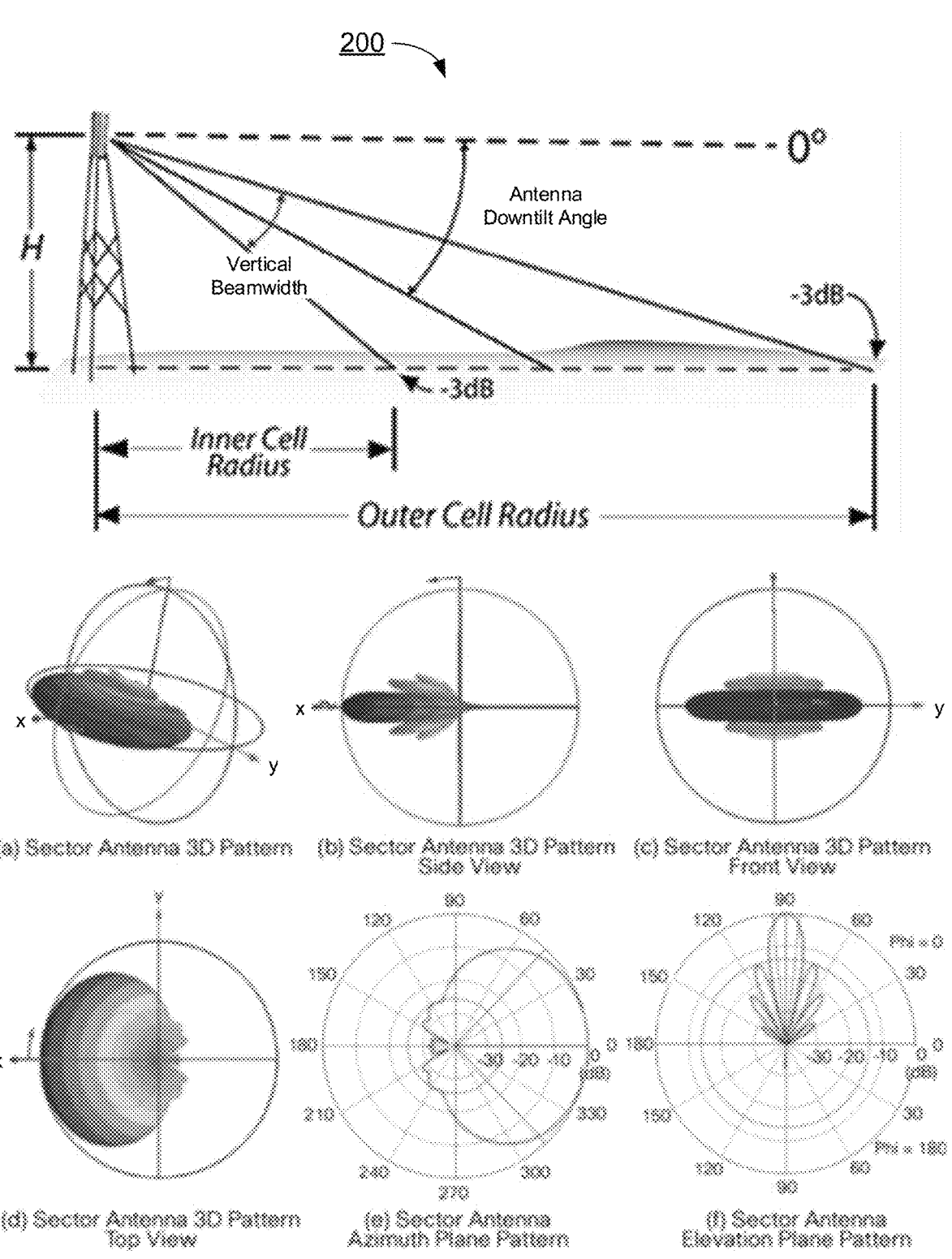
FIG. 2 is a diagram of an example scenario under a proposed scheme in accordance with the present disclosure.

FIG. 2 illustrates an example scenario 200 under the proposed scheme with respect to interference control for reverse pairing in accordance with the present disclosure. Referring to FIG. 2, the interference from a base station (e.g., gNB) to an UL transmission to a satellite may be mitigated by one or more approaches. In a first approach, tilted antennas at the base station may be used, and this may be done as part of network planning. In a second approach, with sector antennas, a signal radiated towards the sky may be kept very small, and this may be done as part of the network planning. In a third approach, a linear polarization direction reaching the satellite may be kept relatively the same for all base stations (e.g., with all antennas kept close to vertical). Advantageously, this approach may allow for more effective cancellation at the base station.

Under the proposed scheme with respect to interference control for reverse pairing in accordance with the present disclosure, there may be multiple options to ensure low interference (e.g., to be less than a threshold) between TN DL transmissions and NTN UL transmissions with directive gain and/or directive emission power mask requirement for TN base station (e.g., gNB or transmit/receive point (TRP)). Under the proposed scheme, different requirements may be defined for different TRP power classes. Additionally, or alternatively, different requirements may be defined for different TRP deployments (e.g., indoor versus outdoor, micro versus macro, and urban versus rural). Additionally, or alternatively, the directive gain and/or directive emission power mask (e.g., effective isotropic radiated power (EIRP)) requirement may be defined at angles higher than a specified angle above the horizon, such as requiring the EIRP to be lower than a specified value. Additionally, or alternatively, the directive gain and/or directive emission power (e.g., EIRP) requirement may be defined with a continuous emission mask for all angles above a specified angle above the horizon, such as requiring the TRP EIRP to be lower than the specified EIRP value from the mask. Under the proposed scheme, a limit on an average TRP transmit (Tx) power per unit of earth surface (dBm per km$^2$) may be used to limit the interference power. An alternative limit may be a limit on the density of base station for different kinds of base station deployment (e.g., urban versus rural or micro versus macro) or different power classes.

Under a proposed scheme in accordance with the present disclosure with respect to restriction on polarization for reverse pairing, restrictions on polarization direction and/or type may be implemented. For instance, the TN base station may be restricted in using vertically or horizontally polarized antennas. Moreover, the TN base station may be restricted in using either left-hand circular polarization (LHCP) or right-hand circular polarization (RHCP). In case that a direct line of sight (LOS) interference between TN base station DL transmissions and NTN UL transmissions is the dominant factor, polarization may help lower interference. For instance, TN DL transmissions may utilize vertical polarization while NTN UL receiver(s) may utilize horizontally polarized antenna(s) or a combination of LHCP and RHCP. Alternatively, TN DL transmissions may utilize RHCP while NTN UL transmissions utilize LHCP. In case that a reflection (non-LOS) interference is the dominant factor, TN DL transmissions and NTN UL receiver(s) may use the same circular polarization (e.g., either LHCP or RHCP). It is noteworthy that a reflection of a LHCP is a RHCP and vice versa. Advantageously, this may allow the re-use of the spectrum.

Illustrative Implementations

Figure 3:
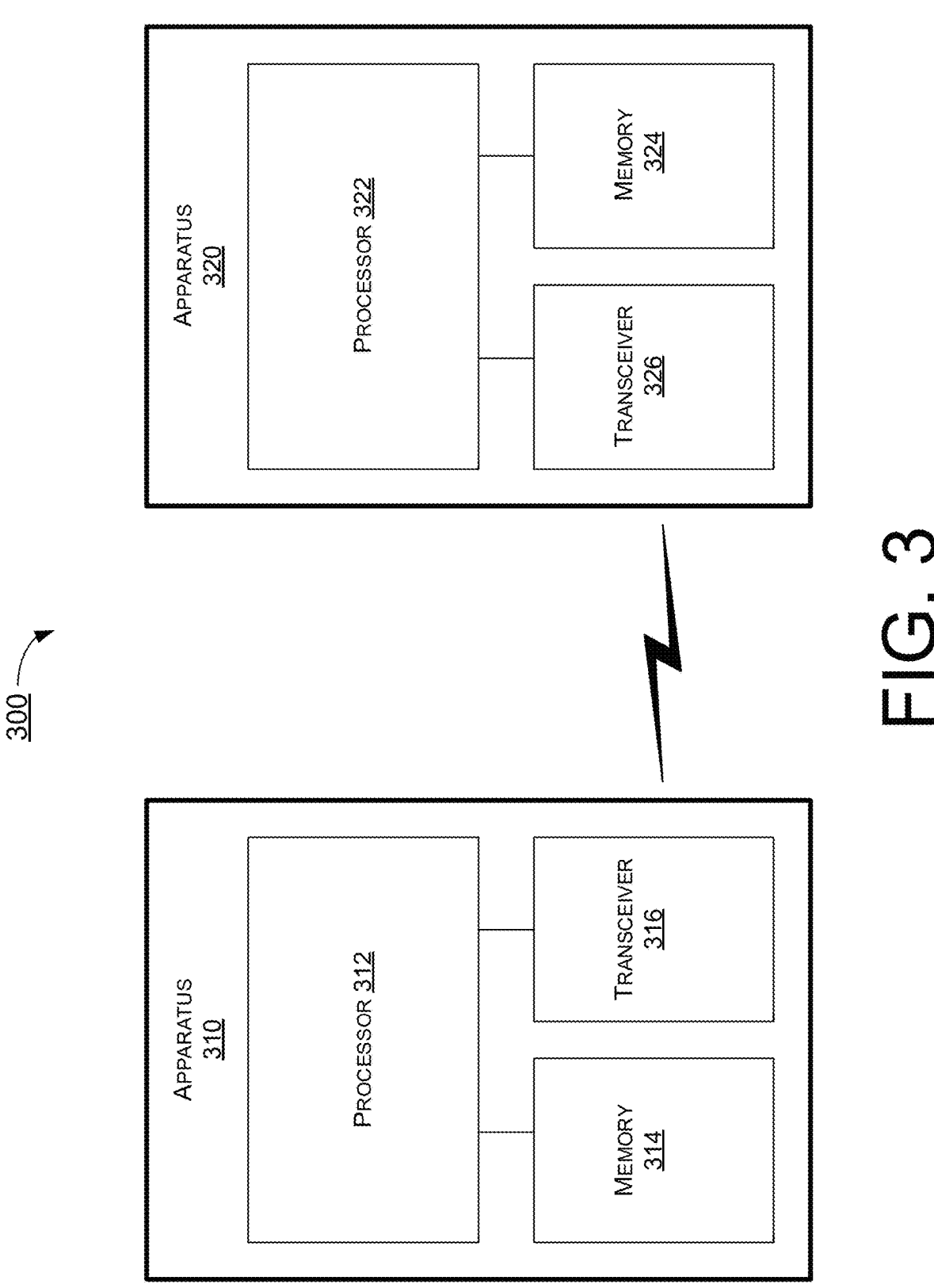
FIG. 3 is a block diagram of an example communication system in accordance with an implementation of the present disclosure.

FIG. 3 illustrates an example communication system 300 having an example apparatus 310 and an example apparatus 320 in accordance with an implementation of the present disclosure. Each of apparatus 310 and apparatus 320 may perform various functions to implement schemes, techniques, processes and methods described herein pertaining to spectrum sharing between a TN and an NTN with interference control, including scenarios/schemes described above as well as process(es) described below.

Apparatus 310 may be a part of an electronic apparatus, which may be a UE such as a portable or mobile apparatus, a wearable apparatus, a wireless communication apparatus or a computing apparatus. For instance, apparatus 310 may be implemented in a smartphone, a smartwatch, a personal digital assistant, a digital camera, or a computing equipment such as a tablet computer, a laptop computer or a notebook computer. Apparatus 310 may also be a part of a machine type apparatus, which may be an IoT, NB-IoT, IIoT or NTN apparatus such as an immobile or a stationary apparatus, a home apparatus, a wire communication apparatus or a computing apparatus. For instance, apparatus 310 may be implemented in a smart thermostat, a smart fridge, a smart door lock, a wireless speaker or a home control center. Alternatively, apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 310 may include at least some of those components shown in FIG. 3 such as a processor 312, for example. Apparatus 310 may further include one or more other components not pertinent to the proposed scheme of the present disclosure (e.g., internal power supply, display device and/or user interface device), and, thus, such component(s) of apparatus 310 are neither shown in FIG. 3 nor described below in the interest of simplicity and brevity.

Apparatus 320 may be a part of an electronic apparatus/station, which may be a network node such as a base station, a small cell, a router, a gateway or a satellite. For instance, apparatus 320 may be implemented in an eNodeB in an LTE, in a gNB in a 5G, NR, IoT, NB-IoT, IIoT, or in a satellite in an NTN network. Alternatively, apparatus 320 may be implemented in the form of one or more IC chips such as, for example and without limitation, one or more single-core processors, one or more multi-core processors, or one or more RISC or CISC processors. Apparatus 320 may include at least some of those components shown in FIG. 3 such as a processor 322, for example. Apparatus 320 may further include one or more other components not pertinent to the proposed scheme of the present disclosure (e.g., internal power supply, display device and/or user interface device), and, thus, such component(s) of apparatus 320 are neither shown in FIG. 3 nor described below in the interest of simplicity and brevity.

In one aspect, each of processor 312 and processor 322 may be implemented in the form of one or more single-core processors, one or more multi-core processors, one or more RISC processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including spectrum sharing between a TN and an NTN with interference control in accordance with various implementations of the present disclosure.

In some implementations, apparatus 310 may also include a transceiver 316 coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326 coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

Each of apparatus 310 and apparatus 320 may be a communication entity capable of communicating with each other using various proposed schemes in accordance with the present disclosure. To aid better understanding, the following description of the operations, functionalities and capabilities of each of apparatus 310 and apparatus 320 is provided in the context of a mobile communication environment in which apparatus 310 is implemented in or as a communication apparatus or a UE (e.g., NTN UE) and apparatus 320 is implemented in or as a network node or base station (e.g., TRP or gNB) of a communication network (e.g., TN). It is also noteworthy that, although the example implementations described below are provided in the context of mobile communications, the same may be implemented in other types of networks.

Under some proposed schemes pertaining to spectrum sharing between a TN and an NTN with interference control in accordance with the present disclosure, with apparatus 310 implemented in or as an NTN UE and apparatus 320 implemented in or as a base station (e.g., TRP or gNB) of a TN, processor 312 may communicate, via transceiver 316, with an NT network node of an NTN by resource sharing with a TN, with a requirement on either or both of a directive gain and a directive emission power with respect to a network node of the TN such that interference between TN DL transmissions and NTN UL transmissions is less than a threshold.

Likewise, processor 322 may communicate, via transceiver 326, with at least one UE (e.g., apparatus 310) by resource sharing with an NTN, with a requirement on either or both of a directive gain and a directive emission power with respect to the network node of the TN such that interference between TN DL transmissions and NTN UL transmissions is less than a threshold.

In some implementations, at least one of the directive gain and the directive emission power may be defined with a continuous emission mask for all angles above a specified angle above a horizon. For instance, an EIRP of the network node of the TN may be lower than a specified EIRP value from the continuous emission mask.

In some implementations, the requirement may include a limit on an average network node Tx power of the TN per unit of earth surface (dBm per $km^2$).

In some implementations, the requirement may include a restriction on an antenna polarization used by the TN. For instance, the restriction on the antenna polarization used by the TN may include the network node of the TN (e.g., apparatus 320 as a TRP of the TN) being restricted to use vertically or horizontally polarized antennas. Alternatively, or additionally, the restriction on the antenna polarization used by the TN may include the network node of the TN (e.g., apparatus 320 as a TRP of the TN) being restricted to use LHCP or RHCP. Alternatively, or additionally, the restriction on the antenna polarization used by the TN may include the network node of the TN (e.g., apparatus 320 as a TRP of the TN) using vertical polarization while a NTN UL receiver uses a horizontally polarized antenna or a combination of LCHP and RCHP. Alternatively, or additionally, the restriction on the antenna polarization used by the TN may include the network node of the TN (e.g., apparatus 320 as a TRP of the TN) using RHCP while a NTN UL receiver uses LHCP. Alternatively, or additionally, the restriction on the antenna polarization used by the TN may include a DL transmission by the network node of the TN (e.g., apparatus 320 as a TRP of the TN) and a NTN UL receiver using a same circular polarization which is either LHCP or RHCP.

Illustrative Processes

FIG. 4 illustrates an example process 400 in accordance with an implementation of the present disclosure. Process 400 may be an example implementation of schemes described above whether partially or completely, with respect to spectrum sharing between a TN and an NTN with interference control in accordance with the present disclosure. Process 400 may represent an aspect of implementation of features of apparatus 310 and/or apparatus 320. Process 400 may include one or more operations, actions, or functions as illustrated by block 410. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by apparatus 310 or any suitable UE or machine type devices. Solely for illustrative purposes and without limitation, process 400 is described below in the context of apparatus 310 implemented in or as an NTN UE and apparatus 320 implemented in or as a base station (e.g., gNB or TRP) of a TN. Process 400 may begin at block 410.

At 410, process 400 may involve processor 312 of apparatus 310 as a UE communicating, via transceiver 316, with an NT network node of an NTN by resource sharing with a TN, with a requirement on either or both of a directive gain and a directive emission power with respect to a network node of the TN such that interference between TN DL transmissions and NTN UL transmissions is less than a threshold.

In some implementations, at least one of the directive gain and the directive emission power may be defined with a continuous emission mask for all angles above a specified angle above a horizon. For instance, an EIRP of the network node of the TN may be lower than a specified EIRP value from the continuous emission mask.

In some implementations, the requirement may include a limit on an average network node Tx power of the TN per unit of earth surface (dBm per km$^2$).

In some implementations, the requirement may include a restriction on an antenna polarization used by the TN. For instance, the restriction on the antenna polarization used by the TN may include the network node of the TN (e.g., apparatus 320 as a TRP of the TN) being restricted to use vertically or horizontally polarized antennas. Alternatively, or additionally, the restriction on the antenna polarization used by the TN may include the network node of the TN (e.g., apparatus 320 as a TRP of the TN) being restricted to use LHCP or RHCP. Alternatively, or additionally, the restriction on the antenna polarization used by the TN may include the network node of the TN (e.g., apparatus 320 as a TRP of the TN) using vertical polarization while a NTN UL receiver uses a horizontally polarized antenna or a combination of LCHP and RHCP. Alternatively, or additionally, the restriction on the antenna polarization used by the TN may include the network node of the TN (e.g., apparatus 320 as a TRP of the TN) using RHCP while a NTN UL receiver uses LHCP. Alternatively, or additionally, the restriction on the antenna polarization used by the TN may include a DL transmission by the network node of the TN (e.g., apparatus 320 as a TRP of the TN) and a NTN UL receiver using a same circular polarization which is either LHCP or RHCP.

FIG. 5 illustrates an example process 500 in accordance with an implementation of the present disclosure. Process 500 may be an example implementation of schemes described above whether partially or completely, with respect to spectrum sharing between a TN and an NTN with interference control in accordance with the present disclosure. Process 500 may represent an aspect of implementation of features of apparatus 310 and/or apparatus 320. Process 500 may include one or more operations, actions, or functions as illustrated by block 510. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by apparatus 310 or any suitable UE or machine type devices. Solely for illustrative purposes and without limitation, process 500 is described below in the context of apparatus 310 implemented in or as an NTN UE and apparatus 320 implemented in or as a base station (e.g., gNB or TRP) of a TN. Process 500 may begin at block 510.

At 510, process 500 may involve processor 322 of apparatus 320 as a network node (e.g., TRP or gNB) of a TN communicating, via transceiver 326, with at least one UE (e.g., apparatus 310) by resource sharing with an NTN, with a requirement on either or both of a directive gain and a directive emission power with respect to the network node of the TN such that interference between TN DL transmissions and NTN UL transmissions is less than a threshold.

In some implementations, at least one of the directive gain and the directive emission power may be defined with a continuous emission mask for all angles above a specified angle above a horizon. For instance, an EIRP of the network node of the TN may be lower than a specified EIRP value from the continuous emission mask.

In some implementations, the requirement may include a limit on an average network node Tx power of the TN per unit of earth surface (dBm per km$^2$).

In some implementations, the requirement may include a restriction on an antenna polarization used by the TN. For instance, the restriction on the antenna polarization used by the TN may include the network node of the TN (e.g., apparatus 320 as a TRP of the TN) being restricted to use vertically or horizontally polarized antennas. Alternatively, or additionally, the restriction on the antenna polarization used by the TN may include the network node of the TN (e.g., apparatus 320 as a TRP of the TN) being restricted to use LHCP or RHCP. Alternatively, or additionally, the restriction on the antenna polarization used by the TN may include the network node of the TN (e.g., apparatus 320 as a TRP of the TN) using vertical polarization while a NTN UL receiver uses a horizontally polarized antenna or a combination of LCHP and RHCP. Alternatively, or additionally, the restriction on the antenna polarization used by the TN may include the network node of the TN (e.g., apparatus 320 as a TRP of the TN) using RHCP while a NTN UL receiver uses LHCP. Alternatively, or additionally, the restriction on the antenna polarization used by the TN may include a DL transmission by the network node of the TN (e.g., apparatus 320 as a TRP of the TN) and a NTN UL receiver using a same circular polarization which is either LHCP or RHCP.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   communicating, by a processor of a user equipment (UE), with a non-terrestrial (NT) network node of a non-terrestrial network (NTN) by resource sharing with a terrestrial network (TN),
   wherein there is a requirement on either or both of a directive gain and a directive emission power with respect to a network node of the TN such that interference between TN downlink (DL) transmissions and NTN uplink (UL) transmissions is less than a threshold,
   wherein at least one of the directive gain and the directive emission power is defined with a continuous emission mask for all angles above a specified angle above a horizon.

2. The method of claim 1, wherein an effective isotropic radiated power (EIRP) of the network node of the TN is lower than a specified EIRP value from the continuous emission mask.

3. The method of claim 1, wherein the requirement comprises a limit on an average network node transmit (Tx) power of the TN per unit of earth surface (dBm per km2).

4. The method of claim 1, wherein the requirement comprises a restriction on an antenna polarization used by the TN.

5. The method of claim 4, wherein the restriction on the antenna polarization used by the TN comprises the network node of the TN being restricted to use vertically or horizontally polarized antennas.

6. The method of claim 4, wherein the restriction on the antenna polarization used by the TN comprises the network node of the TN being restricted to use left-hand circular polarization (LHCP) or right-hand circular polarization (RHCP).

7. The method of claim 4, wherein the restriction on the antenna polarization used by the TN comprises the network node of the TN using vertical polarization while a NTN UL receiver uses a horizontally polarized antenna or a combination of left-hand circular polarization (LHCP) or right-hand circular polarization (RHCP).

8. The method of claim 4, wherein the restriction on the antenna polarization used by the TN comprises the network node of the TN using right-hand circular polarization (RHCP) while a NTN UL receiver uses left-hand circular polarization (LHCP).

9. The method of claim 4, wherein the restriction on the antenna polarization used by the TN comprises a DL transmission by the network node of the TN and a NTN UL receiver using a same circular polarization which is either left-hand circular polarization (LHCP) or right-hand circular polarization (RHCP).

10. A method, comprising:
   communicating, by a processor of a network node of a terrestrial network (TN), with at least one user equipment (UE) by resource sharing with a non-terrestrial network (NTN),
   wherein there is a requirement on either or both of a directive gain and a directive emission power with respect to the network node of the TN such that interference between TN downlink (DL) transmissions and NTN uplink (UL) transmissions is less than a threshold, wherein at least one of the directive gain and the directive emission power is defined with a continuous emission mask for all angles above a specified angle above a horizon.

11. The method of claim 10, wherein an effective isotropic radiated power (EIRP) of the network node of the TN is lower than a specified EIRP value from the continuous emission mask.

12. The method of claim 10, wherein the requirement comprises a limit on an average network node transmit (Tx) power of the TN per unit of earth surface (dBm per km2).

13. The method of claim 10, wherein the requirement comprises a restriction on an antenna polarization used by the TN.

14. The method of claim 13, wherein the restriction on the antenna polarization used by the TN comprises the network node of the TN being restricted to use vertically or horizontally polarized antennas.

15. The method of claim 13, wherein the restriction on the antenna polarization used by the TN comprises the network node of the TN being restricted to use left-hand circular polarization (LHCP) or right-hand circular polarization (RHCP).

16. The method of claim 13, wherein the restriction on the antenna polarization used by the TN comprises the network node of the TN using vertical polarization while a NTN uplink (UL) receiver uses a horizontally polarized antenna or a combination of left-hand circular polarization (LHCP) or right-hand circular polarization (RHCP).

17. The method of claim 13, wherein the restriction on the antenna polarization used by the TN comprises the network node of the TN using right-hand circular polarization (RHCP) while a NTN uplink (UL) receiver uses left-hand circular polarization (LHCP).

18. The method of claim 13, wherein the restriction on the antenna polarization used by the TN comprises a downlink (DL) transmission by the network node of the TN and a NTN uplink (UL) receiver using a same circular polarization which is either left-hand circular polarization (LHCP) or right-hand circular polarization (RHCP).

* * * * *